US009997322B2

(12) United States Patent
Kong et al.

(10) Patent No.: US 9,997,322 B2
(45) Date of Patent: Jun. 12, 2018

(54) ELECTRODE ASSEMBLIES, PLASMA GENERATING APPARATUSES, AND METHODS FOR GENERATING PLASMA

(71) Applicant: Battelle Energy Alliance, LLC, Idaho Falls, ID (US)

(72) Inventors: Peter C. Kong, Idaho Falls, ID (US); Jon D. Grandy, Idaho Falls, ID (US); Brent A. Detering, Idaho Falls, ID (US); Larry D. Zuck, Idaho Falls, ID (US)

(73) Assignee: Battelle Energy Alliance, LLC, Idaho Falls, ID (US)

( * ) Notice: Subject to any disclaimer, the term of this patent is extended or adjusted under 35 U.S.C. 154(b) by 1346 days.

(21) Appl. No.: 13/943,137

(22) Filed: Jul. 16, 2013

(65) Prior Publication Data

US 2013/0300289 A1 Nov. 14, 2013

Related U.S. Application Data

(63) Continuation of application No. 12/020,735, filed on Jan. 28, 2008, now Pat. No. 8,536,481.

(51) Int. Cl.
*B23K 9/00* (2006.01)
*H01J 1/02* (2006.01)
(Continued)

(52) U.S. Cl.
CPC ................. *H01J 1/02* (2013.01); *H05H 1/50* (2013.01); *H05H 7/00* (2013.01)

(58) Field of Classification Search
CPC ................ H01J 1/02; H05H 1/50; H05H 7/00
(Continued)

(56) References Cited

U.S. PATENT DOCUMENTS 3,007,072 A * 10/1961 McGinn .................. H05H 1/34 219/383
3,127,502 A * 3/1964 Freeman .................. H05H 1/32 118/302

(Continued)

FOREIGN PATENT DOCUMENTS

GB 1 248 595 10/1971
WO 01/58625 A1 8/2001

OTHER PUBLICATIONS

"3-Phase 100 kW AC Plasma," Centre d'Energetique, May 14, 2003, 3 pages.

(Continued)

*Primary Examiner* — Dana Ross
*Assistant Examiner* — Joseph Iskra
(74) *Attorney, Agent, or Firm* — TraskBritt

(57) ABSTRACT

Electrode assemblies for plasma reactors include a structure or device for constraining an arc endpoint to a selected area or region on an electrode. In some embodiments, the structure or device may comprise one or more insulating members covering a portion of an electrode. In additional embodiments, the structure or device may provide a magnetic field configured to control a location of an arc endpoint on the electrode. Plasma generating modules, apparatus, and systems include such electrode assemblies. Methods for generating a plasma include covering at least a portion of a surface of an electrode with an electrically insulating member to constrain a location of an arc endpoint on the electrode. Additional methods for generating a plasma include generating a magnetic field to constrain a location of an arc endpoint on an electrode.

25 Claims, 7 Drawing Sheets

(51) Int. Cl.
*H05H 1/50* (2006.01)
*H05H 7/00* (2006.01)

(58) Field of Classification Search
USPC ..... 219/54, 60 R, 69.1, 100, 121.11, 121.41, 219/121.44, 121.43, 121.48, 121.49, 219/121.5, 121.51, 121.52, 121.59, 219/121.123; 313/156, 231.41; 606/40, 606/45, 49; 315/111.21, 111.01
See application file for complete search history.

(56) References Cited

U.S. PATENT DOCUMENTS

| | | | | | |
|---|---|---|---|---|---|
| 3,309,550 | A | | 3/1967 | Wolf et al. | |
| 3,309,873 | A | | 3/1967 | Cann | |
| 3,360,682 | A | | 12/1967 | Moore | |
| 3,403,211 | A | | 9/1968 | Foex | |
| 3,562,486 | A | | 2/1971 | Hatch | |
| 3,594,609 | A | | 7/1971 | Vas | |
| 3,674,978 | A | | 7/1972 | Becker et al. | |
| 3,690,567 | A | | 9/1972 | Borneman | |
| 3,790,742 | A | | 2/1974 | Auer | |
| 3,794,806 | A | | 2/1974 | Klasson | |
| 3,998,619 | A | | 12/1976 | Cerutti et al. | |
| 4,013,867 | A | | 3/1977 | Fey | |
| 4,087,322 | A | | 5/1978 | Marcus | |
| 4,219,726 | A | | 8/1980 | Meyer et al. | |
| 4,282,393 | A | | 8/1981 | Williamson | |
| 4,429,612 | A | | 2/1984 | Tidman et al. | |
| 4,430,588 | A | * | 2/1984 | Way | H02K 44/12 310/11 |
| 4,818,836 | A | | 4/1989 | Bebber et al. | |
| 4,842,683 | A | | 6/1989 | Cheng et al. | |
| 5,039,837 | A | | 8/1991 | Nourbakhsh et al. | |
| 5,132,597 | A | | 7/1992 | Goebel et al. | |
| 5,215,619 | A | | 6/1993 | Cheng et al. | |
| 5,312,471 | A | | 5/1994 | Jung | |
| 5,346,579 | A | | 9/1994 | Cook et al. | |
| 5,420,391 | A | * | 5/1995 | Delcea | H05H 1/42 219/121.47 |
| 5,440,206 | A | | 8/1995 | Kurono et al. | |
| 5,451,738 | A | | 9/1995 | Alvi et al. | |
| 5,674,321 | A | | 10/1997 | Pu et al. | |
| 5,688,417 | A | | 11/1997 | Cadre et al. | |
| 5,707,692 | A | | 1/1998 | Suzuki et al. | |
| 5,767,627 | A | * | 6/1998 | Siniaguine | H05H 1/44 219/121.36 |
| 5,801,489 | A | | 9/1998 | Chism et al. | |
| 5,896,012 | A | | 4/1999 | Munemasa et al. | |
| 5,935,293 | A | | 8/1999 | Detering et al. | |
| 5,935,455 | A | | 8/1999 | Glejboel et al. | |
| 5,980,687 | A | | 11/1999 | Koshimizu et al. | |
| 6,113,731 | A | | 9/2000 | Shan et al. | |
| 6,127,645 | A | | 10/2000 | Titus et al. | |
| 6,163,006 | A | | 12/2000 | Doughty et al. | |
| 6,164,240 | A | | 12/2000 | Nikulin et al. | |
| 6,372,156 | B1 | | 4/2002 | Kong et al. | |
| 6,382,129 | B1 | | 5/2002 | Nikulin | |
| 6,407,382 | B1 | | 6/2002 | Spangler | |
| RE37,853 | E | | 9/2002 | Detering et al. | |
| 6,549,557 | B1 | | 4/2003 | Bowman | |
| 7,741,577 | B2 | | 6/2010 | Kong et al. | |
| 2002/0093294 | A1 | | 7/2002 | Czernichowski et al. | |
| 2005/0115933 | A1 | | 6/2005 | Kong et al. | |
| 2007/0235419 | A1 | * | 10/2007 | Kong | H05H 1/30 219/121.36 |

OTHER PUBLICATIONS

Trivedi et al., "Characterization of a Gas-Stabilized ARc Plasma in an ExB Magnetic Field Configuration," Applied Spectroscopy, vol. 42, No. 6, 1988, pp. 1025-1032.

PCT International Search Report and Written Opinion of the International Searching Authority from PCT/US2009/031530 dated Mar. 17, 2009, 9 pages.

International Preliminary Report on Patentability and Written Opinion of the International Searching Authority, dated Sep. 30, 2008, International Application No. PCT/US20071064467, International Filing Date Mar. 21, 2007.

* cited by examiner

ELECTRODE ASSEMBLIES, PLASMA GENERATING APPARATUSES, AND METHODS FOR GENERATING PLASMA

CROSS-REFERENCE TO RELATED APPLICATIONS

This application is a continuation to U.S. patent application Ser. No. 12/020,735, filed Jan. 28, 2008, now U.S. Pat. No. 8,536,481, issued Sep. 17, 2013, which application is related to U.S. patent application Ser. No. 11/392,141, filed Mar. 28, 2006, now U.S. Pat. No. 7,741,577, issued Jun. 22, 2010, titled "MODULAR HYBRID PLASMA REACTOR AND RELATED SYSTEMS AND METHODS," the entire disclosure of each of which is hereby incorporated herein by this reference

GOVERNMENT RIGHTS

This invention was made with government support under a Cooperative Research and Development Agreement between PPG Industries and Battelle Energy Alliance, LLC under Contract No. DE-AC07-05ID14517, awarded by the U.S. Department of Energy. The government has certain rights in the invention.

FIELD OF THE INVENTION

Embodiments of the present invention relate to plasma reactors and reactor systems, to methods of forming electrodes for such reactors and systems, and to methods for generating an electrical arc in such reactors and systems.

BACKGROUND OF THE INVENTION

Plasma is generally defined as a collection of charged particles containing about equal numbers of positive ions and electrons and exhibiting some properties of a gas, but differing from a gas in that plasma is generally a good conductor of electricity and may be affected by a magnetic field. A plasma may be generated, for example, by passing a gas through an electric arc. The electric arc will rapidly heat the gas by resistive and radiative heating to very high temperatures within microseconds of the gas passing through the arc. Essentially any gas may be used to produce a plasma in such a manner. Thus, inert or neutral gases (e.g., argon, helium, neon or nitrogen) may be used, reductive gases (e.g., hydrogen, methane, ammonia or carbon monoxide) may be used, or oxidative gases (e.g., oxygen, water vapor, chlorine, or carbon dioxide) may be used depending on the process in which the plasma is to be utilized.

Plasma generators, including those used in conjunction with, for example, plasma torches, plasma jets and plasma arc reactors, generally create an electric discharge in a working gas to create the plasma. Plasma generators have been formed as direct current (DC) generators, alternating current (AC) plasma generators, as radio frequency (RF) plasma generators and as microwave (MW) plasma generators. Plasmas generated with RF or MW sources may be referred to as inductively coupled plasmas. In one example of an RF-type plasma generator, the generator includes an RF source and an induction coil surrounding a working gas. The RF signal sent from the source to the induction coil results in the ionization of the working gas by induction coupling to produce a plasma. In contrast, DC- and AC-type generators may include two or more electrodes (e.g., an anode and cathode) with a voltage differential defined therebetween. An arc may be formed between the electrodes to heat and ionize the surrounding gas such that the gas obtains a plasma state. The resulting plasma, regardless of how it was produced, may then be used for a specified process application.

For example, plasma jets may be used for the precise cutting or shaping of a component; plasma torches may be used in forming a material coating on a substrate or other component; and plasma reactors may be used for the high-temperature heating of material compounds to accommodate the chemical or material processing thereof. Such chemical and material processing may include the reduction and decomposition of hazardous materials. In other applications, plasma reactors have been utilized to assist in the extraction of a desired material, such as a metal or metal alloy, from a compound that contains the desired material.

Processes that utilize plasma-type reactors are disclosed in, for example, U.S. Pat. No. 5,935,293 and RE37,853 both issued to Detering et al. and assigned to the assignee of the present invention, the disclosures of each of which patents are incorporated herein in their entireties by this reference. The processes set forth in the Detering patents include the heating of one or more reactants by means of, for example, a plasma torch to form from the reactants a thermodynamically stable high temperature stream containing a desired end product. The gaseous stream is rapidly quenched, such as by expansion of the gas, in order to obtain the desired end products without experiencing back reactions within the gaseous stream. In one embodiment, the desired end product may include acetylene and the reactants may include methane and hydrogen. In another embodiment, the desired end product may include a metal, metal oxide or metal alloy and the reactant may include a specified metallic compound. Of course, such processes are merely examples and numerous other types of processes may be carried out using plasma technologies.

As noted above, process applications utilizing plasma generators are often specialized and, therefore, the associated plasma jets, torches and/or reactors need to be designed and configured according to highly specific criteria. Such specialized designs often result in a device that is limited in its usefulness. In other words, a plasma generator that is configured to process a specific type of material using a specified working gas to form the plasma is not necessarily suitable for use in other processes wherein a different working gas may be required, wherein the plasma is required to exhibit a substantially different temperature or wherein a larger or smaller volume of plasma is desired to be produced.

BRIEF SUMMARY OF THE INVENTION

In some embodiments of the present invention, electrode assemblies include structures or devices configured to constrain or control a location of an arc endpoint on an electrode of the electrode assemblies. In some embodiments, the structure or device may comprise one or more electrically insulating members that are configured to cover at least a portion of an electrode assembly. In other embodiments, the structure or device may generate or otherwise provide a magnetic field configured to control or constrain a location of an arc endpoint on an electrode of the electrode assembly. In yet further embodiments, the electrode assemblies may include both a structure for providing such a magnetic field and one or more electrically insulating members that are configured to cover at least a portion of an electrode.

Additional embodiments of the present invention include apparatus and systems for generating a plasma that include one or more such electrode assemblies.

In yet further embodiments of the present invention, methods for generating a plasma are provided that include constraining a location of an arc endpoint to a location or region on an electrode. In some embodiments, the methods may include covering at least a portion of an electrode with one or more electrically insulating members. In other embodiments, the methods may include providing a magnetic field configured to constrain a location of an arc endpoint to a location on an electrode. In additional embodiments, the methods may comprise both providing such a magnetic field and covering at least a portion of an electrode with one or more electrically insulating members.

BRIEF DESCRIPTION OF THE SEVERAL VIEWS OF THE DRAWINGS

While the specification concludes with claims particularly pointing out and distinctly claiming that which is regarded as the present invention, the advantages of this invention may be more readily ascertained from the following description of the invention when read in conjunction with the accompanying drawings in which:

DETAILED DESCRIPTION OF THE INVENTION

The illustrations presented herein are not meant to be actual views of any particular plasma generating apparatus or device, but are merely idealized representations that are employed to describe various embodiments of the present invention. It is noted that elements that are common between figures may retain the same numerical designation.

Embodiments of the present invention are related to plasma reactor systems and methods like those disclosed in U.S. patent application Ser. No. 11/392,141, filed Mar. 28, 2006, now U.S. Pat. No. 7,741,577, issued Jun. 22, 2010, and titled "Modular Hybrid Plasma Reactor and Related Systems and Methods," the disclosure of which is incorporated herein in its entirety by this reference. Furthermore, components, features, and characteristics of embodiments of the present invention may be incorporated into the plasma reactor systems disclosed in U.S. patent application Ser. No. 11/392,141, now U.S. Pat. No. 7,741,577, and components, features, and characteristics of the plasma reactor systems disclosed in U.S. patent application Ser. No. 11/392,141, now U.S. Pat. No. 7,741,577, may be incorporated into embodiments of the present invention.

The term "module" as used herein means any structure that is configured to be attached to another structure to provide an apparatus including the two structures, the function, capability or method of operation of the apparatus being easily modified by adding, removing, or changing the structures.

Figure 1:
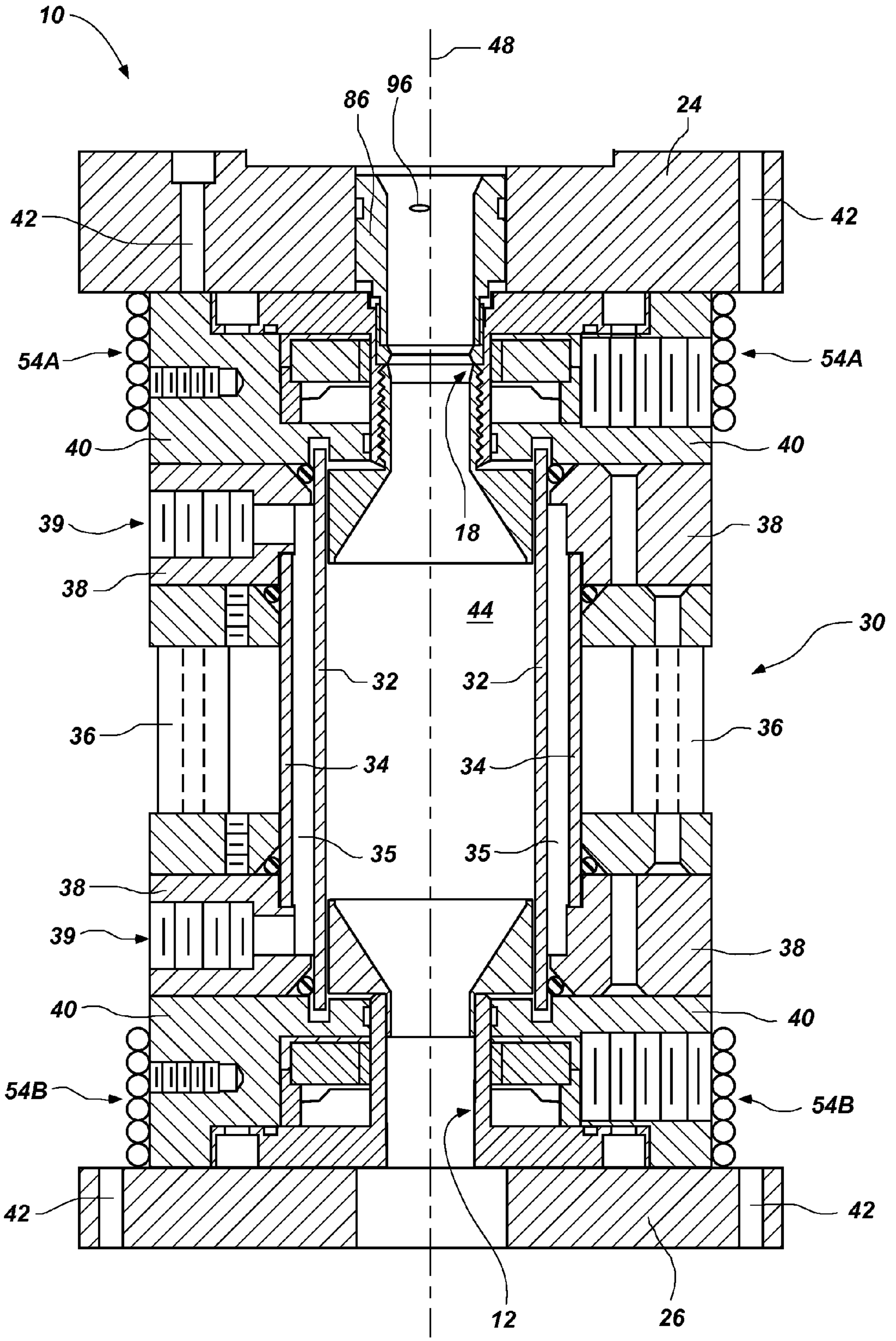
FIG. 1 is a cross-sectional view of a module that may be used as part of a plasma generating apparatus in accordance with an embodiment of the present invention.

Referring to FIG. 1, a module 10 that may be used as a plasma generating apparatus (or as a component part of a plasma generating apparatus) is shown in accordance with one embodiment of the presently disclosed invention. The module 10 includes an electrode pair comprising an anode assembly 12 and a cathode assembly 18. The electrode pair is configured to provide an electrical arc between an anode of the anode assembly 12 and a cathode of the cathode assembly 18, as discussed in further detail below. The module 10 may also include a first endplate 24, a second endplate 26, and an arc-enclosing structure 30.

The arc-enclosing structure 30 may be configured to at least partially enclose a defined volume through which an electrical arc extending between the anode of the anode assembly 12 and the cathode of the cathode assembly 18 passes. The arc-enclosing structure 30 may include, for example, a first cylindrical tube 32, a second cylindrical tube 34 having a diameter larger than a diameter of the first cylindrical tube 32, at least two rods or posts 36, two connecting disks 38, and compression plates 40. The first cylindrical tube 32, the second cylindrical tube 34, and the posts 36 may all be secured and connected to the connecting disks 38. It is noted that all of such described components are not necessary to the function of the module 10, and that some of the components may be integrally formed. For example, the compression plates 40 may be eliminated or otherwise integrated into other components. Additionally, the module 10 may include other components not specifically shown or described. For example, O-rings or other seal members may be disposed between various interfacing surfaces of the individual components. In a more specific example, O-rings or other seal members may be disposed at a location adjacent the inner diameter of the compression plates 40 at the location where they abut the first cylindrical tube 32 (as shown in FIG. 1) or at other similar interfacing locations.

The first cylindrical tube 32 and the second cylindrical tube 34 may each comprise an electrically insulating refractory material such as, for example, quartz. The first cylindrical tube 32 may be positioned within the second cylindrical tube 34 so as to define a generally annular space 35 therebetween. A fluid passageway 39 may be defined in each of the connecting disks 38 and be arranged in communication with the annular space 35. One fluid passageway 39 may be configured as a fluid inlet and one fluid passageway 39 may be configured as a fluid outlet of the annular space 35. A fluid (not shown), such as water or some other coolant, may be circulated through one fluid passageway 39, through the annular space 35, and out of the second fluid passageway 39 so as to transfer heat from the arc-enclosing structure 30 including the first cylindrical tube 32.

The posts 36 may be used to provide added structural support to the arc-enclosing structure 30. The posts 36 may be formed from, for example, a polymer material such as a phenolic material. While not shown, rods or other structural components may be used to couple the various components together. For example, a threaded rod may extend between the first and second end plates 24 and 26 and through appropriately sized and located openings 42 formed therein. Thus, in one embodiment, such rods may be used to compress the first and second endplates 24 and 26 toward one another to hold the other components of the module 10 in their desired positions. In other embodiments, the openings 42 may be used to couple the module 10 with other modules or other associated components.

Still referring to FIG. 1, the anode assembly 12 and the cathode assembly 18 each may have a substantially annular shape, and together with the arc-enclosing structure 30 may define a substantially cylindrical aperture or bore 44 extending through the module 10 and centered about a longitudinal axis 48. As used herein, the term "substantially annular" means of, relating to, or forming any three-dimensional structure having an interior void or aperture extending through the structure from a first side of the structure to a second side of the structure. The interior void or aperture may be of any shape including, but not limited to, circular, oval, triangular, rectangular, etc., and may have a complex curved shape. By way of example and not limitation, substantially annular shapes include any prismatic shape (polyhedrons with two polygonal faces lying in parallel planes and with the other faces parallelograms) in which an interior void or aperture extends between two polygonal faces of the prismatic shape that are disposed in parallel planes, such as, for example, hollow cylindrical shapes.

The first endplate 24 and the second endplate 26 each may also have an interior void or aperture extending therethrough.

The anode assembly 12 and the cathode assembly 18 are configured to provide an electrical arc that extends through the bore 44 from an electrical arc endpoint on the anode of the anode assembly 12 to an electrical arc endpoint on the cathode of the cathode assembly 18.

Figure 2A:
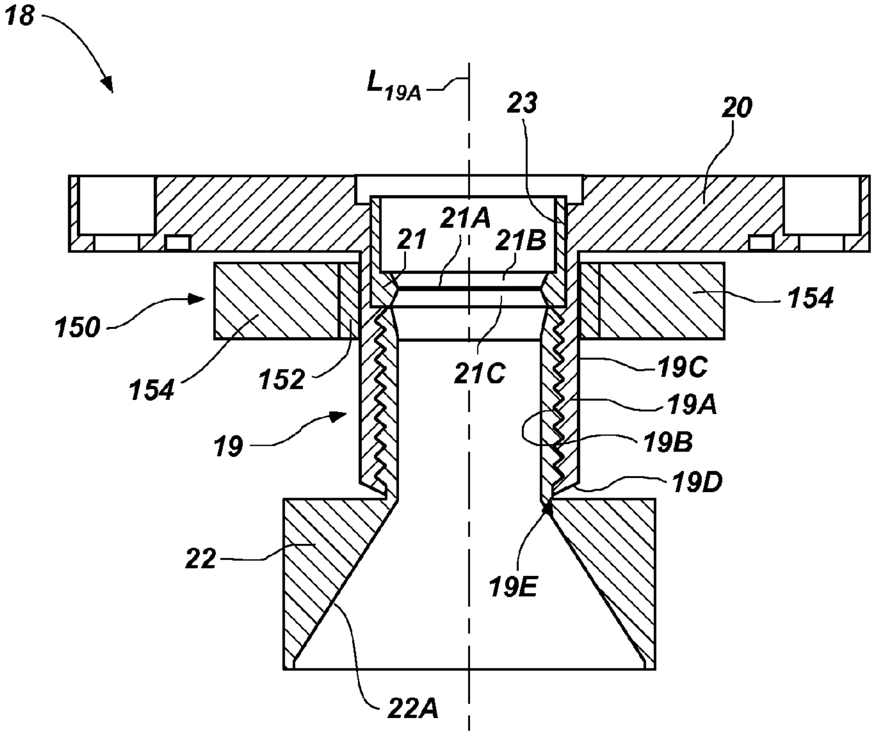
FIGS. 2A and 2B are cross-sectional side views of an embodiment of an electrode assembly that may be used in the module shown in FIG. 1.
Figure 3A:
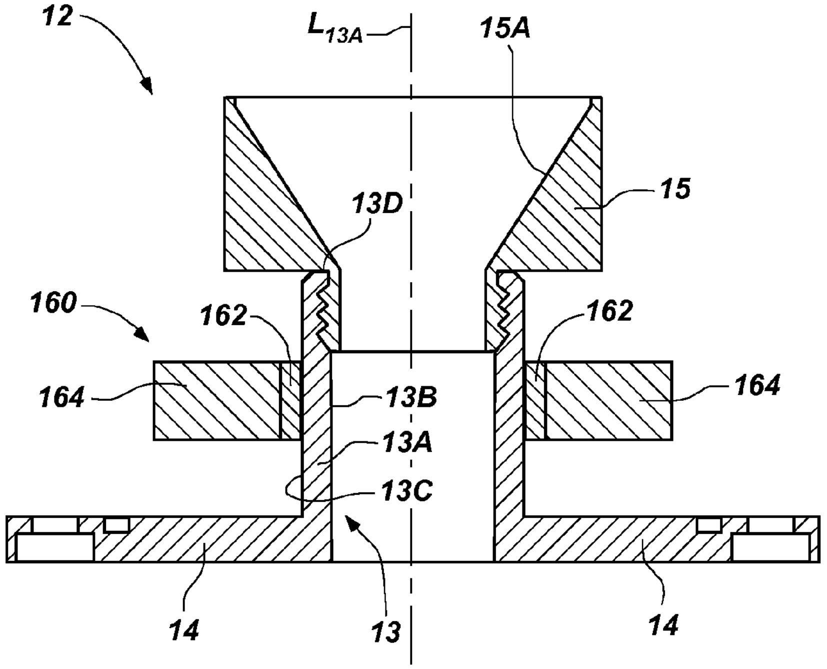
FIGS. 3A and 3B are cross-sectional side views of another embodiment of an electrode assembly that may be used in the module shown in FIG. 1.

FIG. 2A is an enlarged cross-sectional view of a portion of the cathode assembly 18 shown in FIG. 1, and FIG. 3A is an enlarged cross-sectional view of a portion of the anode assembly 12 shown in FIG. 1.

Referring to FIG. 2A, in some embodiments, the cathode assembly 18 may comprise a cathode 19 having a generally tubular configuration. The cathode 19 shown in FIG. 2A includes a generally tubular wall 19A having an inner surface 19B and an outer surface 19C. In some embodiments, the generally tubular wall 19A may be cylindrical and centered about a longitudinal axis $L_{19A}$, as shown in FIG. 2A. The cathode 19 also may include a generally radially extending flange 20, which may facilitate seating of the cathode 19 on other components of the module 10, such as, for example, a compression plate 40 (FIG. 1).

The cathode assembly 18 may further comprise an interior protrusion 21 that protrudes in a generally radially inward direction from the generally tubular wall 19A toward the longitudinal axis $L_{19A}$. The interior protrusion 21 may include an edge 21A which, in one embodiment, may be defined by an intersection between a first surface 21B of the interior protrusion 21 and a second surface 21C of the interior protrusion 21. Each of the first surface 21B and the second surface 21C of the interior protrusion 21 may be beveled in some embodiments, and may have a frustoconical shape. Furthermore, the edge 21A may define a substantially circular surface feature.

In the embodiment shown in FIG. 2A, the interior protrusion 21 comprises a generally ring-shaped member that is separately formed from the generally tubular wall 19A. Such a ring-shaped member may be formed to have an outer diameter similar to (e.g., within a few thousandths of an inch of) an inner diameter of the generally tubular wall 19A, such that physical and electrical contact is established between the ring-shaped member and the generally tubular wall 19A when the ring-shaped member is positioned within the generally tubular wall 19A to form the interior protrusion 21. The generally tubular wall 19A and the ring-shaped member may be formed from any conductive material including, for example, metals and metal alloys. As particular non-limiting examples, the generally tubular wall 19A may comprise a highly conductive material such as, for example, copper or a copper alloy, and the ring-shaped member may comprise a conductive material having a relatively high melting temperature, such as, for example, tungsten or a tungsten alloy.

The ring-shaped member may simply be positioned within the generally tubular wall 19A. In additional embodiments, the ring-shaped member may be press-fit within the generally tubular wall 19A. In further embodiments, a high-temperature conductive adhesive material may be used to secure the ring-shaped member to the generally tubular wall 19A, or the ring-shaped member may be welded, brazed, or soldered to the generally tubular wall 19A.

In additional embodiments, the interior protrusion 21 may be integrally formed with the generally tubular wall 19A. In such embodiments, the interior protrusion 21 may comprise an integral portion of the generally tubular wall 19A. As an example, the generally tubular wall 19A may be machined or cast so as to form the interior protrusion 21 on the inner surface 19B of the generally tubular wall 19A.

In some embodiments, at least a portion of the inner surface 19B of the generally tubular wall 19A may be covered with an electrically insulating material, such as a high temperature ceramic material, in an effort to constrain the location of an arc endpoint to the edge 21A, as described in further detail below. As particular non-limiting examples, the electrically insulating material may comprise an oxide (e.g., alumina, zirconia, silica, etc.) or nitride material (e.g., boron nitride, silicon nitride, etc.).

By way of example, the cathode 19 may comprise an electrically insulating member 22 formed of electrically insulating material that is disposed at least partially within the generally tubular wall 19A. As shown in FIG. 2A, the electrically insulating member 22 covers a portion of the inner surface 19B of the generally tubular wall 19A and leaves exposed at least the edge 21A of the interior protrusion 21. The electrically insulating member 22 may also cover at least a portion of an end surface 19D of the generally tubular wall 19A, as also shown in FIG. 2A. Optionally, at least a portion of the electrically insulating member 22 may comprise a frustoconical or funnel-shaped inner surface 22A, which may improve or enhance the flow of plasma gases through the bore 44 of the module 10 (FIG. 1). Furthermore, as shown in FIG. 2A, the electrically insulating member 22 may include a first portion configured to be received within the generally tubular wall 19A and a second portion configured to be received within the first cylindrical tube 32 (FIG. 1).

In some embodiments, the electrically insulating member 22 may comprise one or more threads configured to engage one or more complementary threads formed in the inner surface 19B of the generally tubular wall 19A, as shown in FIG. 2A. In such embodiments, the electrically insulating member 22 may be threaded to the generally tubular wall 19A to secure the electrically insulating member 22 and the generally tubular wall 19A together. In additional embodiments, the electrically insulating member 22 may be press-fit within the generally tubular wall 19A, and/or an adhesive material may be used to secure the electrically insulating member 22 to the inner surface 19B of the generally tubular wall 19A.

The cathode 19 may further comprise an additional electrically insulating member 23 that is also formed of electrically insulating material and is disposed at least partially within the generally tubular wall 19A. For example, the additional electrically insulating member 23 may be disposed at least partially within the generally tubular wall 19A on a side of the interior protrusion 21 opposite from the electrically insulating member 22. In certain embodiments, as shown in FIG. 2A, the additional electrically insulating member 23 may not include any threads (like the threads 246 of the electrically insulating member 222 (see FIGS. 6 and 7)) for securing the additional electrically insulating member 23 to the generally tubular wall 19A. In such embodiments, the electrically insulating member 22 may simply be inserted into, or press-fit within, the generally tubular wall 19A, and/or an adhesive material may be used to secure the additional electrically insulating member 23 to the inner surface 19B of the generally tubular wall 19A.

The electrically insulating member 22 and the additional electrically insulating member 23 may be used to constrain a location of an arc endpoint to an exposed location on the interior protrusion 21 (which, together with the generally tubular wall 19A, forms part of the conductive body of the cathode 19), and in particular, to constrain the location of such an arc endpoint to a location on the exposed edge 21A of the interior protrusion 21. In other words, the electrically insulating member 22 and the additional electrically insulating member 23 may prevent the arc from directly contacting the generally tubular wall 19A, and may force the arc to directly contact the interior protrusion 21. By using the electrically insulating member 22 and the additional electrically insulating member 23 to the arc endpoint to an exposed location on the interior protrusion 21, damage to the cathode 19 may be reduced and, hence, the operating lifetime of the cathode 19 may be extended relative to previously known embodiments of electrodes, in which the arc endpoint may be located at an edge 19E extending along the intersection between the inner surface 19B and an end surface 19D of a generally tubular wall member 19A.

With continued reference to FIG. 2A, the cathode assembly 18 may further include a magnetic structure 150, which may be used to provide a magnetic field configured to constrain the location of an arc endpoint to a selected location or within a selected region on the interior of the generally tubular wall 19A. The magnetic structure 150 may comprise a physical magnet having a generally annular shape. In some embodiments, the magnetic structure 150 may extend around (i.e., encircle) the generally tubular wall 19A, as shown in FIG. 2A. A dielectric material or structure 152 may be interposed between the magnetic structure 150 and the generally tubular wall 19A (and/or other electrically conductive components of the cathode assembly 18). The dielectric material or structure 152 may comprise, for example, a ceramic material (e.g., alumina, boron nitride, or aluminum nitride) and may be used to position and hold the magnetic structure 150 relative to the generally tubular wall 19A. The dielectric material or structure 152 may comprise, for example, one or more dielectric washers or collets.

Figure 2B:
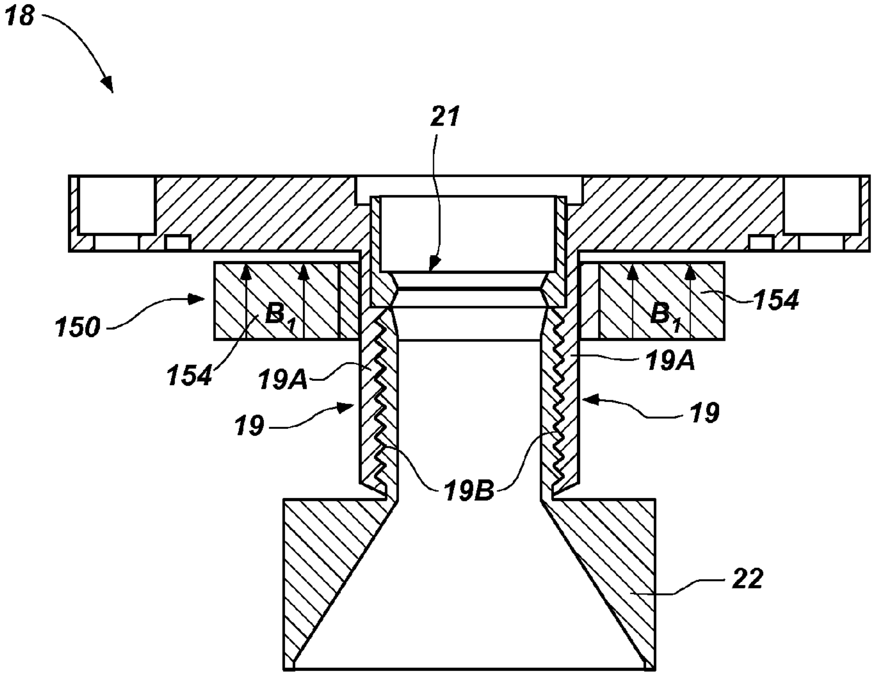

The magnetic structure 150 may comprise, for example, a solid permanent magnet 154 comprising one or more rare earth magnetic materials such as, for example, samarium-cobalt and neodymium-iron-boron. The magnetic structure 150 may be used to generate a magnetic field within the generally tubular wall 19A of the cathode 19 that is configured to constrain the location of an arc endpoint to a selected location or within a selected region on the interior of the generally tubular wall 19A. For example, assuming that the arc will extend from an exposed location on the cathode 19 in the downward direction of FIG. 1 into and through the bore 44 (FIG. 1) to a location on the anode assembly 12, the magnetic structure 150 may be used to generate a magnetic field $B_1$ having an orientation as shown in FIG. 2B, in which the magnetic field $B_1$ within the generally tubular wall 19A extends in a generally upward direction (the term "upward" referring to the upward direction when viewing FIGS. 1, 2A, and 2B in their depicted orientation). Moving the location of the magnetic structure 150 up or down relative to the generally tubular wall 19A may cause the location of the arc endpoint to also move up or down on the inner surface 19B of the generally tubular wall 19A with the relative location of the magnetic structure 150.

By using the magnetic structure 150 as shown in FIGS. 2A and 2B, the location of the arc endpoint may be further constrained to a location other than on the edge 19E (FIG. 2A) of the generally tubular wall 19A, which may reduce damage to the cathode 19 during operation, as previously discussed.

FIG. 3A is an enlarged cross-sectional view of a portion of the anode assembly 12 shown in FIG. 1. As shown therein, the anode assembly 12 may be similar to the cathode assembly 18 in that the anode assembly 12 includes an electrically insulating member 15 that is similar to the electrically insulating member 22 (FIG. 2A), and a magnetic structure 160 that is similar to the magnetic structure 150 (FIG. 2A). The anode assembly 12 may differ from the cathode assembly 18, however, in that the anode assembly 12 may not include an interior protrusion, such as the interior protrusion 21 (FIG. 2A), or an additional electrically insulating member, such as the additional electrically insulating member 23 (FIG. 2A).

In some embodiments, the anode assembly 12 may comprise an anode 13 having a generally tubular configuration. The anode 13 shown in FIG. 3A includes a generally tubular wall 13A having an inner surface 13B and an outer surface 13C. In some embodiments, the generally tubular wall 13A may be cylindrical and centered about a longitudinal axis $L_{13A}$, as shown in FIG. 3A. The anode 13 also may include a generally radially extending flange 14, which may facilitate seating of the anode 13 on other components of the module 10, such as, for example, a compression plate 40 (FIG. 1).

The electrically insulating member 15 may be similar to the electrically insulating member 22 (FIG. 2A), and may have a portion at least partially disposed within the generally tubular wall 13A. As shown in FIG. 3A, the electrically insulating member 15 covers a portion of the inner surface 13B of the generally tubular wall 13A, but leaves exposed at least a portion of the inner surface 13B. The electrically insulating member 15 may also cover at least a portion of an end surface 13D of the generally tubular wall 13A, as also shown in FIG. 2A. Optionally, at least a portion of the electrically insulating member 15 may comprise a generally frustoconical or funnel-shaped inner surface 15A, which may improve or enhance the flow of plasma gases through the bore 44 of the module 10 (FIG. 1). As shown in FIG. 3A, in some embodiments, the electrically insulating member 15 may be simply inserted into, or press fit within, the generally tubular wall 13A of the anode 13, and may not be threaded onto the anode 13.

Figure 3B:
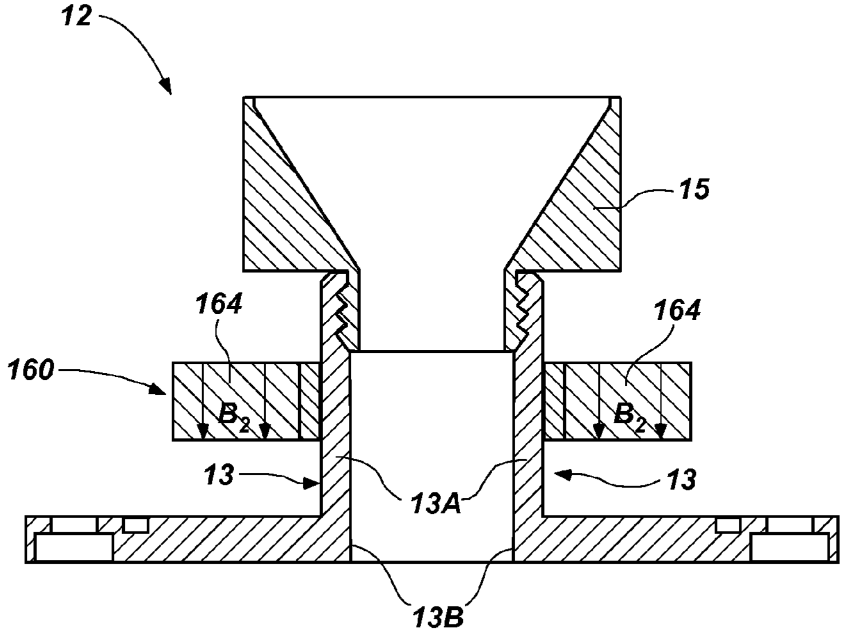

The magnetic structure 160 may be substantially similar to the magnetic structure 150 (FIG. 2A), and may be used to provide a magnetic field configured to constrain the location of an arc endpoint to a selected location or within a selected region on the interior of the generally tubular wall 13A. The magnetic structure 160 may comprise a physical magnet 164 having a generally annular shape. In some embodiments, the magnetic structure 160 may extend around (i.e., encircle) the generally tubular wall 13A, as shown in FIG. 3A, and a dielectric material or structure 162 may be interposed between the magnetic structure 160 and the generally tubular wall 13A (and/or other electrically conductive components of the anode assembly 12). The magnetic structure 160 may comprise, for example, a solid permanent magnet 164 comprising one or more rare earth magnetic materials such as, for example, samarium-cobalt and neodymium-iron-boron. Such materials are often referred to as "super-magnetic materials." The magnetic structure 160 may be used to generate a magnetic field within the generally tubular wall 13A of the anode 13 that is configured to constrain the location of an arc endpoint to a selected location or within a selected region on the interior of the generally tubular wall 13A. For example, assuming that the arc will extend from an exposed location on the anode 13 in the upward direction of FIG. 1 into and through the bore 44 (FIG. 1) to a location on the cathode assembly 18, the magnetic structure 160 may be used to generate a magnetic field $B_2$ having an orientation as shown in FIG. 3B, in which the magnetic field $B_2$ within the generally tubular wall 13A extends in a generally downward direction (the term "downward" referring to the downward direction when viewing FIGS. 1, 3A, and 3B in their depicted orientation). Moving the location of the magnetic structure 160 up or down relative to the generally tubular wall 13A may cause the location of the arc endpoint to also move up or down on the inner surface 13B of the generally tubular wall 13A with the relative location of the magnetic structure 160.

In additional embodiments of the invention, both the anode assembly 12 and the cathode assembly 18 may have a configuration like that of the cathode assembly 18, as shown in FIGS. 2A and 2B. In other embodiments, both the anode assembly 12 and the cathode assembly 18 may have a configuration like that of the anode assembly 12, as shown in FIGS. 3A and 3B. In still other embodiments, the anode assembly 12 may have a configuration like that of the cathode assembly 18, as shown in FIGS. 2A and 2B, and the cathode assembly 18 may have a configuration like that of the anode assembly 12, as shown in FIGS. 3A and 3B. Furthermore, one or both of the anode assembly 12 and the cathode assembly 18 may have a configuration like that described in U.S. patent application Ser. No. 11/392,141, filed Mar. 28, 2006, now U.S. Pat. No. 7,741,577, issued Jun. 22, 2010.

Figure 4:
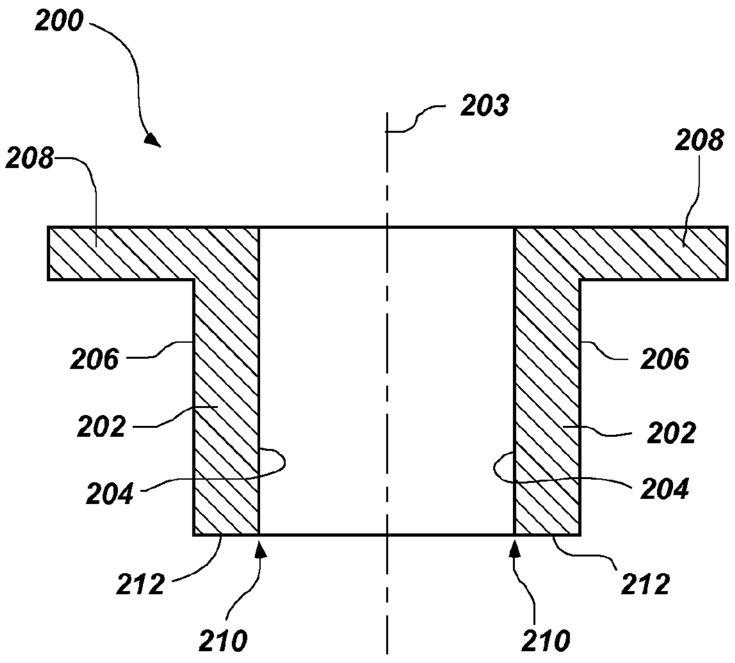
FIG. 4 is a cross-sectional side view of another embodiment of an electrode that may be used in the module shown in FIG. 1.

Embodiments of the present invention also may include electrodes having a simple configuration relative to those previously described herein. For example, in some embodiments, one or both of the anode assembly 12 and the cathode assembly 18 may simply comprise an electrode 200, as shown in FIG. 4. The electrode 200 includes a generally tubular wall 202 that may be centered about a longitudinal axis 203. The generally tubular wall 202 may include an inner surface 204 and an outer surface 206, and may have a radially extending flange 208 to facilitate seating of the electrode 200 on other components of the module 10 (FIG. 1). As the electrode 200 does not include any device or structure that is configured to constrain the location of an arc endpoint to a selected location or within a selected region on the inner surface 204 of the generally tubular wall 202, the arc endpoint may be located at the edge 210 extending along the intersection between the inner surface 204 and an end surface 212 of the generally tubular wall 202. Location of the arc endpoint on the edge 210, however, may result in relatively more damage to the electrode 200 during operation and, hence, a decreased operational lifetime relative to the embodiments previously described in relation to FIGS. 2A and 2B and 3A and 3B.

Figure 5:
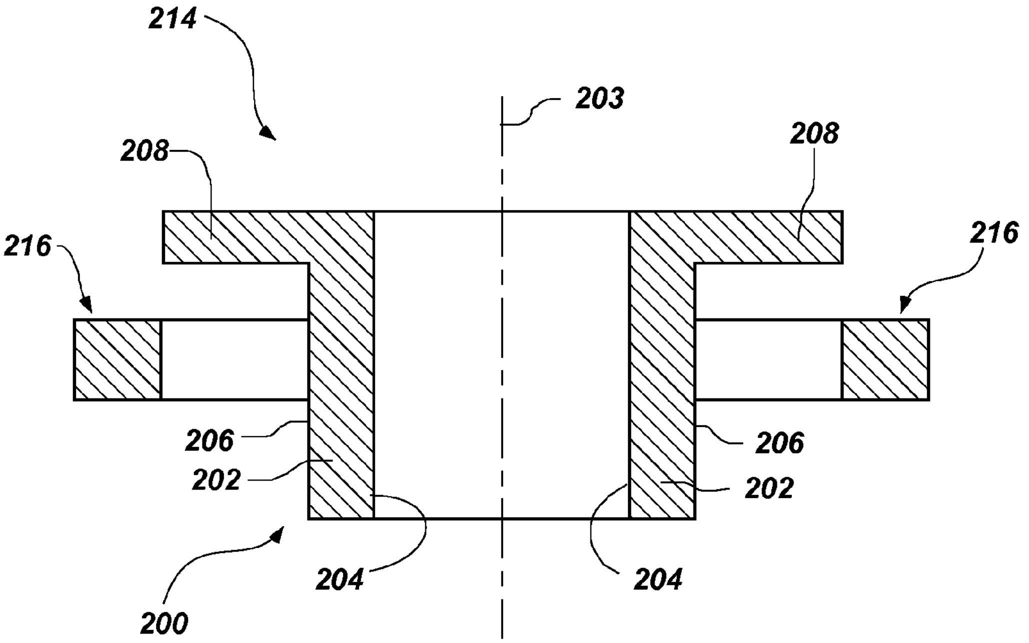
FIG. 5 is a cross-sectional side view of another embodiment of an electrode assembly that may be used in the module shown in FIG. 1.

FIG. 5 illustrates another embodiment of an electrode assembly 214 that may be used as one or both of the anode assembly and the cathode assembly in plasma reactor system modules, like the module 10 shown in FIG. 1. As shown in FIG. 5, the electrode assembly 214 includes an electrode 200 as previously described with reference to FIG. 4, but further including a magnetic structure 216 for providing a magnetic field configured to constrain the location of an arc endpoint to a selected location or within a selected region on the inner surface 204 of the generally tubular wall 202. In some embodiments, the magnetic structure 216 may be substantially identical to the magnetic structure 154 previously described with reference to FIGS. 2A and 2B.

Figure 6:
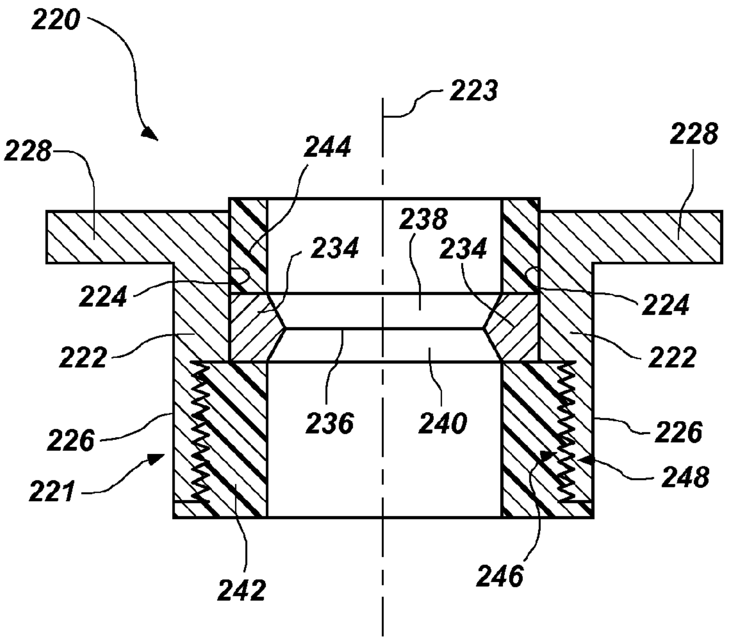
FIG. 6 is a cross-sectional side view of another embodiment of an electrode assembly that may be used in the module shown in FIG. 1.

FIG. 6 illustrates another embodiment of an electrode assembly 220 that may be used as one or both of the anode assembly and the cathode assembly in plasma reactor system modules, such as, for example, the module 10 shown in FIG. 1. As shown in FIG. 6, the electrode assembly 220 includes an electrode 221 that is generally similar to that previously described with reference to FIG. 4 and includes a generally tubular wall 222 that may be centered about a longitudinal axis 223. The generally tubular wall 222 may include an inner surface 224 and an outer surface 226, and may have a radially extending flange 228 to facilitate seating of the electrode 221 on other components of the module 10 (FIG. 1). The electrode assembly 220 may further comprise an interior protrusion 234 that protrudes in a generally radially inward direction from the generally tubular wall 222 toward the longitudinal axis 223. The interior protrusion 234 may include an edge 236 defined, for example, by an intersection between a first surface 238 of the interior protrusion 234 and a second surface 240 of the interior protrusion 234. Each of the first surface 238 and the second surface 240 of the interior protrusion 234 may be beveled, and may have a frustoconical shape. Furthermore, the edge 236 may be substantially circular.

In the embodiment shown in FIG. 6, the interior protrusion 234 comprises a generally ring-shaped member that is separately formed from the generally tubular wall 222, and the interior protrusion 234 may be secured to the generally tubular wall 222 (and electrical contact established therebetween) in any of the methods previously described with reference to the interior protrusion 21 shown in FIGS. 1, 2A, and 2B. In additional embodiments, the interior protrusion 234 may be integrally formed with the generally tubular wall 222.

The electrode assembly 220 may further comprise an electrically insulating member 242, which may be generally similar to the electrically insulating member 22 previously described with reference to FIGS. 1, 2A, and 2B, and may comprise one or more threads 246 configured to engage one or more complementary threads 248 formed in the inner surface 224 of the generally tubular wall 222 and securing the electrically insulating member 242 to the generally tubular wall 222. The electrode assembly 220 may further comprise an additional electrically insulating member 244 that is substantially similar to the insulating member 23 previously described with reference to FIGS. 1, 2A, and 2B. The electrically insulating member 242 and the additional electrically insulating member 244 may be used to constrain a location of an arc endpoint to an exposed location on the interior protrusion 234 (which, together with the generally tubular wall 222, forms part of the conductive body of the electrode 220), and in particular, to constrain the location of such an arc endpoint to a location on the exposed edge 236 of the interior protrusion 234. In other words, the electrically insulating member 242 and the additional electrically insulating member 244 may prevent the arc from directly contacting the generally tubular wall 222, and may force the arc to directly contact the internal protrusion 234. By using the electrically insulating member 242 and the additional electrically insulating member 244 to constrain the location of an arc endpoint to an exposed location on the interior protrusion 234, damage to the electrode 220 may be reduced and, hence, the operational lifetime of the electrode 220 may be extended.

Figure 7:
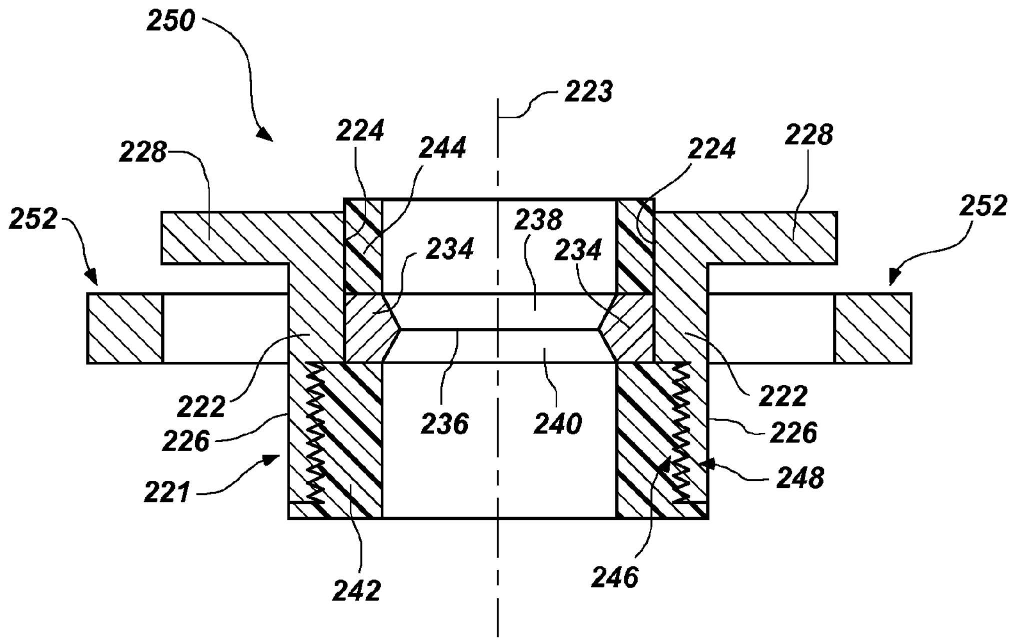
FIG. 7 is a cross-sectional side view of another embodiment of an electrode assembly that may be used in the module shown in FIG. 1.

FIG. 7 illustrates another embodiment of an electrode assembly 250 that may be used as one or both of the anode assembly and the cathode assembly in plasma reactor system modules, such as, for example, the module 10 shown in FIG. 1. As shown in FIG. 7, the electrode assembly 250 is substantially identical to the electrode assembly 220 shown in FIG. 6, but further including a magnetic structure 252 for providing a magnetic field configured to further constrain the location of an arc endpoint to an exposed location on the interior protrusion 234. In some embodiments, the magnetic structure 252 may be substantially identical to the magnetic structure 154 previously described with reference to FIGS. 2A and 2B.

As will be appreciated from the above description, embodiments of the present invention may comprise electrode assemblies that are configured to constrain the location of an arc endpoint to a selected area or region on an electrode for reducing damage to the electrode and extending the operational lifetime of the electrode. For example, electrically insulating members may be located adjacent selected areas or regions of the electrodes to prevent an arc endpoint from contacting those selected areas or regions. Furthermore, magnetic structures may be used to provide magnetic fields that will constrain the location of an arc endpoint to a selected area or region on the electrodes.

Referring again to FIG. 1, an electrical power source (not shown) may be provided and configured to apply a voltage between the anode 13 (FIGS. 3A and 3B) of the anode assembly 12 and the cathode 19 (FIGS. 2A and 2B) of the cathode assembly 18. If the magnitude of the voltage between the anode 13 and the cathode 19 reaches a critical point, an electrical arc (not shown) may be generated and caused to extend between the anode assembly 12 and the cathode assembly 18. The magnitude of this critical-point voltage may be reduced by providing charged ions within the bore 44 between the anode assembly 12 and the cathode assembly 18 thereby reducing the resistivity between the anode assembly 12 and cathode assembly 18. In this manner, the anode assembly 12, the cathode assembly 18, and the electrical power source provide a device configured to generate an electrical arc within the module 10. By way of example and not limitation, the power source may include a direct current (DC) power source configured to provide a voltage in a range extending from about 70 volts to about 80 volts and a current in a range from about 90 amps to about 110 amps between the anode 13 and the cathode 19.

The module 10 may also include at least one device configured to generate a magnetic field in a desired region within the module 10, and the magnetic field may be selectively controlled to move the location of at least a portion of an electrical arc within the module 10, as described in U.S. patent application Ser. No. 11/392,141, filed Mar. 28, 2006, now U.S. Pat. No. 7,741,577. For example, the module 10 may include an electrically conductive wire wound in a coil 54A. The coil 54A may surround at least a portion of the module 10. In one particular embodiment, the coil 54A may surround at least a portion of the module 10 proximate the cathode assembly 18. The module 10 may include an additional electrically conductive wire wound in a coil 54B that surrounds a portion of the module 10 such as, for example, at a location proximate the anode assembly 12. An electrical power source (not shown) may be provided and configured to pass electrical current through the electrically conductive wire forming the coil 54A, and an electrical power source (not shown) may be provided and configured to pass electrical current through the electrically conductive wire forming the coil 54B.

As an electrical current is passed through the coils 54A and 54B, a magnetic field of a desired strength may be generated in a desired region within the module 10 depending on the configuration of the coils 54A and 54B and the strength of current flowing therethrough. In one example, a magnetic field may be generated in a region located within the module 10 between the arc endpoint on the anode assembly 12 and the arc endpoint on the cathode assembly 18. The magnetic field produced by such coils may be used advantageously to influence one or more characteristics of the generated arc.

An electrical arc comprises a flow of electrons, each electron having a negative charge by definition. When an electrical arc is generated in the module 10, the negatively charged electrons may travel through the bore 44 from the cathode assembly 18 to the anode assembly 12 (e.g., from the arc end point of the cathode assembly 18 to the arc endpoint of the anode assembly 12).

The electrons of the electrical arc may experience a force as the electrons move through the magnetic field generated by the coils 54A and 54B, and this force may cause at least a portion of the electrical arc extending between the anode assembly 12 and the cathode assembly 18 to move in a substantially circular motion within the bore 44 of the module 10.

By selectively controlling the magnetic fields within the module 10 produced by the electrically conductive coils 54A and 54B, the circumferential location of the arc endpoint on the anode assembly 12 and the circumferential location of the arc endpoint on the cathode assembly 18 may be made to move concurrently in the same circular direction about the axis 48 within the module 10. In another embodiment, the circumferential location of the arc endpoint on the anode assembly 12 and the circumferential location of the arc endpoint on the cathode assembly 18 may be made to move in opposite circular directions about the axis 48 by selectively controlling the magnetic fields within the module 10.

The voltage between the anode assembly 12 and the cathode assembly 18, the current passing through the coil 54B proximate the anode assembly 12, and the current passing through the coil 54A proximate the cathode assembly 18 may each be selectively controlled to selectively manipulate the location and movements of the electrical arc extending between the anode assembly 12 and the cathode assembly 18.

In accordance with one aspect of the present invention, a plasma generating apparatus may include one or more modules such as, for example, the module 10 shown and described with respect to FIG. 1.

Figure 8:
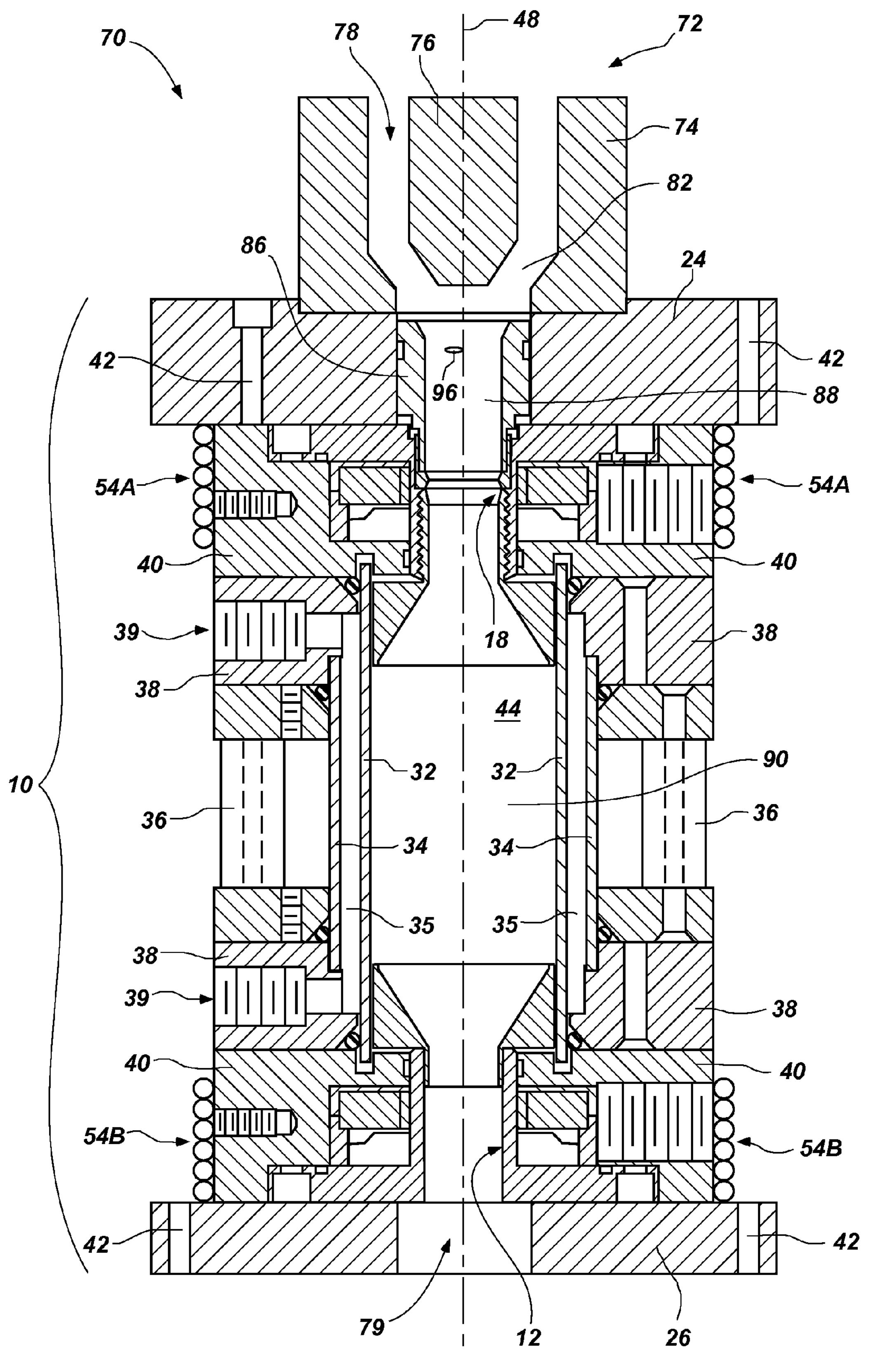
FIG. 8 is a cross-sectional view of a plasma generating apparatus in accordance with an embodiment of the present invention.

For example, referring to FIG. 8, a plasma generating apparatus 70 is shown in accordance with one embodiment of the present invention that includes the module 10 previously described herein in relation to FIG. 1 and which may further include an arc-generating device 72 attached to the module 10. The arc-generating device 72 includes an additional electrode pair comprising an anode 74 and a cathode 76. By way of example and not limitation, the cathode 76 may exhibit a substantially solid, cylindrical shape, and the anode 74 may exhibit a substantially annular shape defining an aperture extending therethrough. The anode 74 may have a generally hollow, cylindrical shape with a generally tapered surface at one end thereof so as to maintain a substantially conformally spaced relationship with the cathode 76. The cathode 76 may be at least partially positioned within the anode 74.

The plasma generating apparatus 70 may include an additional electrical power source (not shown) that is configured to provide a voltage between the anode 74 and the cathode 76 of the arc-generating device 72. If the magnitude of a voltage applied between the anode 74 and the cathode 76 reaches a critical point, an electrical arc (not shown) extending between the anode 74 and the cathode 76 may be generated. The distance separating the anode 74 and the cathode 76 of the arc-generating device 72 may be significantly less than the distance separating the anode assembly 12 and the cathode assembly 18 of the module 10. Therefore, the magnitude of the voltage required to generate an electrical arc between the anode 74 and the cathode 76 of this arc-generating device 72 may be significantly lower than the magnitude of the voltage required to generate an electrical arc between the anode assembly 12 and the cathode assembly 18 of the module 10. In one embodiment, the arc-generating device 72 may include a commercially available plasma torch.

The electrical arc generated between the anode 74 and the cathode 76 may be referred to as an "ignition arc" in the sense that the electrical arc may be subsequently used to facilitate ignition of an electrical arc extending between the anode assembly 12 and the cathode assembly 18 of the module 10. Matter, such as a plasma gas, may be passed through an inlet 78, which may include the space 82 between the anode 74 and the cathode 76. The ignition arc extending between the anode 74 and the cathode 76 may generate a plasma that includes charged ions and electrons originating from atoms or molecules of the matter passing through the space 82 proximate the ignition arc. These charged ions and electrons may flow through the bore 44 to regions between the anode assembly 12 and the cathode assembly 18. The presence of the charged ions and electrons between the anode assembly 12 and the cathode assembly 18 may lower the magnitude of the voltage required to generate an electrical arc therebetween, as previously discussed herein.

Once an electrical arc is established between the anode assembly 12 and the cathode assembly 18 of the module 10, the location of the electrical arc within the bore 44 may be selectively manipulated by controlling the current flow through coils 54A and 54B to generate one or more magnetic fields within the bore 44 as previously discussed. The currents passed through the coils 54A and 54B may be selectively controlled so as to optimize the density of the charged species in the plasma and the distribution of the plasma within the chamber 90 of the plasma generating apparatus 70.

The plasma generating apparatus 70 may also include an inlet structure 86 disposed between the arc-generating device 72 and the module 10 defining one or more additional material inlets 96 into the chamber 90. The inlet structure 86 may exhibit a substantially annular shape and may include an aperture or bore 88 extending therethrough that defines a space between the arc generating device 72 and the bore 44 of the module 10 and is also in communication with each. A chamber 90 of the plasma generating apparatus 70 is collectively defined by the bore 88 of the inlet structure 86 and the bore 44 of the module 10. As shown in FIG. 8, in some embodiments, the inlet structure 86 may be configured to be received within an endplate 24. In additional embodiments, inlet structures such as those described in U.S. patent application Ser. No. 11/392,141, filed Mar. 28, 2006, now U.S. Pat. No. 7,741,577, may be used in the plasma generating apparatus 70.

The inlets 96 may be formed as passages through the body of the inlet structure 86 and may be configured to introduce material passing through the inlets 96 into the chamber 90 such that the material exhibits a generally circular or helical flow path within the chamber 90. By way of example and not limitation, the inlet structure 86 may comprise a first inlet 96 configured to introduce material passing through the inlets 96 into the chamber 90 such that the material exhibits a generally clockwise circular or helical flow path, and a second inlet 96 configured to introduce material passing through the inlets 96 into the chamber 90 such that the material exhibits a generally counter-clockwise circular or helical flow path. In one embodiment, one or more of the inlets 96 may be configured to introduce matter into the chamber 90 such that the flow path of the matter is initially generally tangential, nearly tangential, or at an acute angle relative to a tangent of the interior surface of the inlet structure 86 adjacent the location of the inlet 96.

With continued reference to FIG. 8, matter such as, for example, a gas or a liquid may be passed into the chamber 90 and caused to follow a desired flow path (e.g., a generally or substantially circular or helical flow path) by way of the additional inlet or passage 96 of the inlet structure 86. Causing the matter within the chamber 90 to rotate in a generally circular or helical path may cause an electrical arc extending between the anode assembly 12 and the cathode assembly 18 of the module 10 to move in a generally circular path following the path of charged species within the bore 44, even in the absence of any magnetic fields generated by the electrically conductive coils 54A or 54B. In this manner, the inlet 96 may be used to selectively move the location of at least a portion of the electrical arc within the bore 44. Moving the electrical arc within the bore 44 may enhance the density of charged particles within the plasma and enhance the distribution of the plasma within the bore 44. Thus, the density of charged particles within the plasma and the distribution of the plasma within the bore 44 may be optimized by selectively moving the electrical arc within the bore 44 in a manner that provides optimum conditions therein.

Additionally, the passage or inlet 96 of the inlet structure 86 may be configured to swirl matter passing therethrough into the chamber 90 in a generally circular or helical flow path in a first direction about the longitudinal axis 48 of the chamber 90 of the plasma generating apparatus 70, and the coils 54A and 54B may be configured to generate magnetic fields within the chamber 90 that cause at least a portion of the electrical arc to move in a generally circular motion in a second, opposite direction about the longitudinal axis 48 of the chamber 90. For example, an electrical arc extending between an arc endpoint on the cathode assembly 18 and an arc endpoint on the anode assembly 12 may be selectively rotated about the longitudinal axis 48 in a clockwise direction within the chamber 90, while the inlet 96 may be configured to induce a swirling flow path of the matter within the chamber 90 in a counter-clockwise direction within the chamber 90. In such a configuration, turbulent flow of matter within the chamber 90 may be increased, which may enhance the mixing of the molecules, atoms, and ions within the chamber 90.

In another embodiment, the inlet structure 86 and the coils 54A and 54B may be selectively configured such that the flow path of the material flowing through the chamber 90 is the same as (or concurrent with) the motion of the arc about the longitudinal axis 48.

To use the plasma generating apparatus 70 to process or synthesize materials, raw materials may be passed from the inlet 78 of the arc-generating device 72, the inlet 96 of the inlet structure 86, or from both, through the chamber 90 to an outlet 79 of the plasma generating apparatus 70. Other additional materials or chemicals, which may be used as catalysts, oxidizers, reducers or serve as a plasma gas, may also be passed through the chamber 90 from one or both of the inlets 78, 96 to an outlet 79 of the plasma generating apparatus 70. The electrical arc extending between the anode assembly 12 and the cathode assembly 18 may generate a plasma comprising reactive ions from at least one of the raw materials and the other materials or chemicals. The reactive ions may facilitate chemical transformations in the raw materials and chemical reactions between the raw materials and the other additional materials or chemicals. These chemical transformations and reactions may be used to process or synthesize a wide variety of materials or chemicals. In some embodiments, the plasma generating apparatus 70 may be used to conduct either oxidative or reductive chemical reactions in the plasma. In another example, the plasma generating apparatus 70 may be used to produce nanoparticles from larger, solid particles of raw materials.

The structure and configuration of the module 10 enables plasma generating apparatuses to be quickly and easily assembled and configured to process or synthesize particular materials by fastening and arranging a selected number of modules 10 together. For example, a selected number of modules 10 may be secured together in an end-to-end configuration to provide a plasma generating apparatus having desired properties and operating characteristics.

Figure 9:
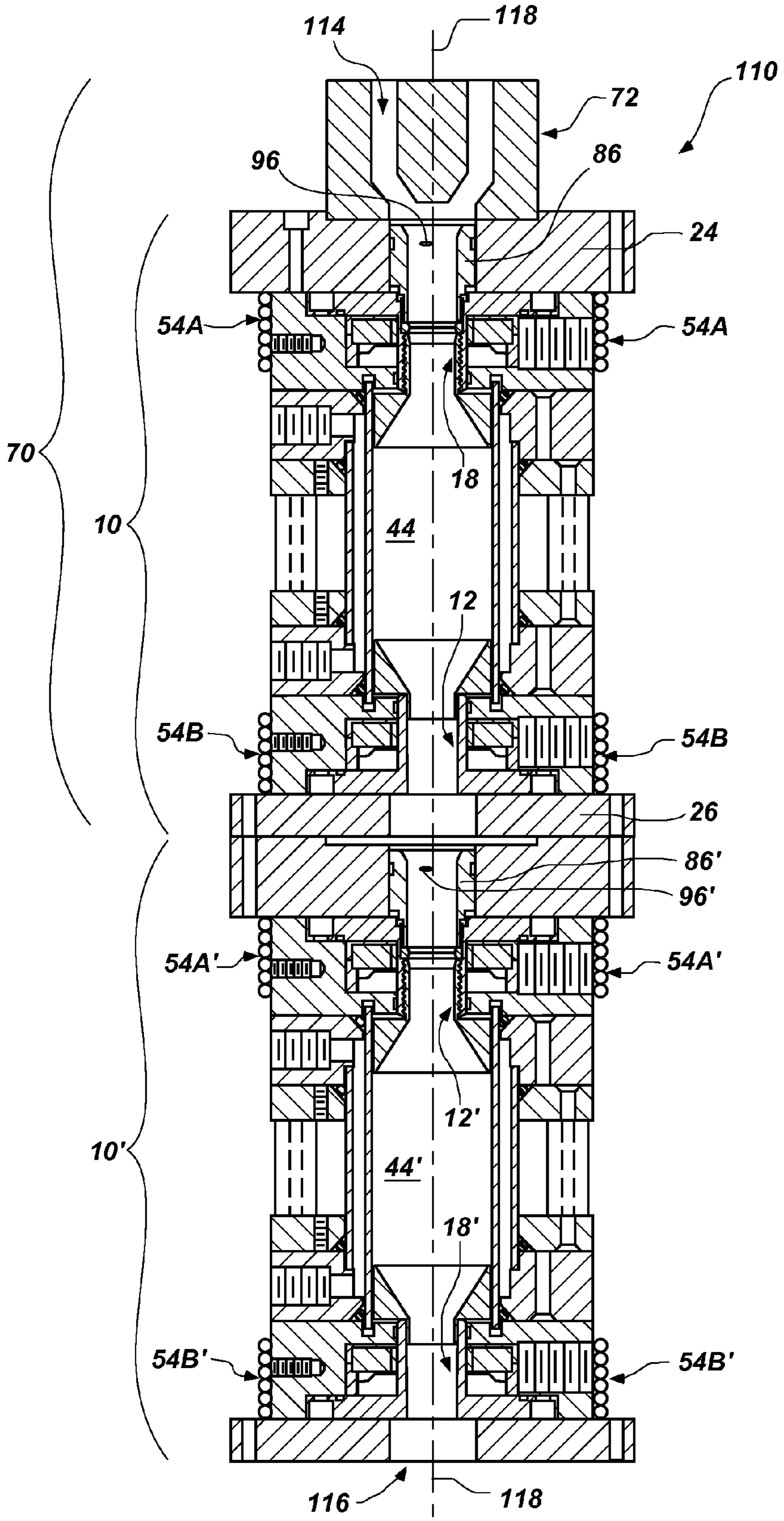
FIG. 9 is a cross-sectional view of another plasma generating apparatus in accordance with another embodiment of the present invention.

Referring to FIG. 9, a plasma generating apparatus 110 according to another embodiment of the present invention is shown. The plasma generating apparatus 110 includes the previously described plasma generating apparatus 70 shown in FIG. 8 and an additional module 10' (referred to as a second module 10' for purposes of clarity) secured thereto. The second module 10' may be substantially identical to the module 10 previously described herein (referred to subsequently herein as a "first module 10" for purposes of clarity), and may include, generally, an anode assembly 12', a cathode assembly 18', and a bore 44'. In this configuration, the plasma generating apparatus 110 includes a chamber comprising at least the bore 44 of the first module 10 and the bore 44' of the second module 10'. The plasma generating apparatus 110 also may include an inlet 114 and an outlet 116 that are each in communication with the chamber.

An electrical power source (not shown), may be provided and configured to apply a voltage between the anode assembly 12' and the cathode assembly 18'. In some embodiments, the position of the anode assembly 12' and the cathode assembly 18' in the module 10' may be switched relative to the first module 10.

An electrical power source (not shown) may be provided and configured to pass electrical current through an electrically conductive wire forming a coil 54A' adjacent the anode assembly 12', and an electrical power source (not shown) may be provided and configured to pass electrical current through an electrically conductive wire forming a coil 54B' adjacent the cathode assembly 18'.

An electrical arc extending through the bore 44' between an arc endpoint on the anode assembly 12' and an arc endpoint on the cathode assembly 18' of the module 10' may be selectively moved, due to the magnetic fields imposed by the coils 54A' and 54B', in a circular motion about a longitudinal axis 118 of the chamber in a direction that is opposite to the direction of motion of an electrical arc extending through the bore 44 between an arc endpoint on the anode assembly 12 and an arc endpoint on the cathode assembly 18 of the first module 10. In other words, at least a portion of an electrical arc within the first module 10 may be moved in a first circular direction about an axis 118 within the chamber of the plasma generating apparatus 110, while at least a portion of an electrical arc within the second module 10' may be moved in a second, opposite circular direction about the axis 118 within the chamber of the plasma generating apparatus 110. In additional embodiments, at least a portion of an electrical arc within the first module 10 may be induced to move in a circular direction about an axis within the chamber of the plasma generating apparatus 110, and at least a portion of an electrical arc within the second module 10' may be induced to moved in the same circular direction about the axis 118 within the chamber of the plasma generating apparatus 110.

As previously described herein, the passage or inlet 96 of the inlet structure 86 may be configured to introduce matter passing through the inlet 96 into the bore 44 such that it swirls either a clockwise or a counter-clockwise direction within the chamber (when looking through the chamber from the inlet 114 toward the outlet 116). Similarly, the passage or inlet 96' of the second inlet structure 86' may be configured to introduce matter passing through the inlet 96 into the bore 44' such that it swirls in either a clockwise or a counter-clockwise direction within the chamber. Moreover, the additional inlet 96 of the inlet structure 86 and the additional inlet 96' of the second inlet structure 86' may be selectively configured to swirl matter passing through the inlets 96, 96' in either the same (concurrent) direction about the axis 118 within the chamber or in opposite (countercurrent) directions about the axis 118 within the chamber.

It is noted, therefore, that the plasma generating apparatus 110 shown and described with respect to FIG. 9 can be operated in at least sixteen different configurations or modes since the inlet structures 86 and 86' can each be independently configured to swirl matter in either the clockwise or the counter-clockwise direction, the first module 10 can be configured to move at least a portion of its electrical arc in either the clockwise or the counter-clockwise direction, and the second module 10' can be configured to move at least a portion of its electrical arc in either the clockwise or the counter-clockwise direction about the longitudinal axis 118. As can be recognized, plasma generating apparatuses that embody teachings of the present invention may be operated in at least $2^N$ different configurations or modes, where N is equal to the total number of modules and inlet structures that are configured to induce a swirling motion of the matter flowing through the chamber of the apparatus.

Individual modules of a plasma generating apparatus may be additionally selectively configured. For example, the power supplied to the anode assembly 12' and the cathode assembly 18' of the module 10' may be less than, equal to, or greater than the power supplied to the anode assembly 12 and the cathode assembly 18 of the first module 10. For example, the power supplied to the electrode pairs of each module 10, 10' may increase in the direction extending from the inlet 114 to the outlet 116 of the plasma generating apparatus 110. In another embodiment, the power supplied to the electrode pairs of each module 10, 10' may decrease in the direction extending from the inlet 114 to the outlet 116 of the plasma generating apparatus 110. In yet another embodiment, the power being supplied to each module may be substantially consistent.

The plasma generating apparatuses and devices described herein may be used to process or synthesize materials. Modular plasma generating devices that embody teachings of the present invention allow for plasma generating apparatuses and systems to be quickly and easily customized for processing or synthesizing particular materials. Furthermore, plasma generating apparatuses embodying teachings of the present invention as described herein may be used to provide large heating zones and resulting plasmas that are characterized by enhanced uniformity of temperature. Furthermore, an unlimited number of modular plasma generating devices may be assembled to provide plasma generating apparatuses of virtually unlimited lengths, thereby providing long residence times for materials within the chamber. The use of multiple modules in a plasma generating device enables residence times of materials within plasma to be more accurately controlled, which ultimately leads to greater stability and predictability in material reactions of a given process. Furthermore, by constraining the location of the arc endpoints to selected areas or regions on the electrodes, damage to the electrodes may be reduced and the operational lifetime of the electrodes may be increased.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention includes all modifications, equivalents, and alternatives falling within the spirit and scope of the invention as defined by the following appended claims and their legal equivalents.

What is claimed is:

1. An electrode assembly for a plasma generating apparatus comprising:

an electrically conductive electrode body configured to provide an endpoint for an electrical arc, the electrically conductive electrode body comprising:

a tubular wall having an inner surface and an outer surface; and a protrusion protruding inwardly from the tubular wall in a direction toward a longitudinal axis about which the tubular wall is centered, the protrusion including an edge extending along an intersection between at least two surfaces of the protrusion; and at least one electrically insulating member disposed at least partially within and in contact with the tubular wall of the electrode body, the at least one electrically insulating member covering at least a portion of the inner surface of the tubular wall and leaving exposed at least the edge of the interior protrusion.

2. The electrode assembly of claim 1, wherein the electrode body comprises:

a first member comprising the tubular wall; and a separately formed second member comprising the protrusion, the second member positioned within and electrically coupled to the first member.

3. The electrode assembly of claim 1, wherein the protrusion comprises an integral portion of the tubular wall.

4. The electrode assembly of claim 1, wherein the electrically conductive electrode body comprises a metal or metal alloy.

5. The electrode assembly of claim 1, wherein the at least one electrically insulating member comprises a ceramic material.

6. The electrode assembly of claim 1, wherein the at least one electrically insulating member comprises:

a first electrically insulating member disposed at least partially within the tubular wall of the electrode body on a first longitudinal side of the interior protrusion of the electrode body; and a second electrically insulating member disposed at least partially within the tubular wall of the electrode body on a second longitudinal side of the interior protrusion of the electrode body.

7. The electrode assembly of claim 1, wherein the at least one electrically insulating member further covers at least a portion of an end surface of the tubular wall configured to be positioned closest to another electrically conductive electrode body.

8. The electrode assembly of claim 1, wherein the at least one electrically insulating member comprises at least one threaded surface coupled with a complementary threaded surface of the electrode body.

9. The electrode assembly of claim 1, wherein the edge of the protrusion extends along an intersection between two frustoconical surfaces of the protrusion.

10. The electrode assembly of claim 1, wherein the edge has a circular shape.

11. An electrode assembly for a plasma generating apparatus comprising:

an electrically conductive electrode body comprising a generally tubular wall having an inner surface and an outer surface, and a protrusion protruding from the generally tubular wall in a generally radially inward direction, the protrusion comprising an edge extending along an intersection between at least two surfaces of the protrusion; and a structure for generating a magnetic field configured to control a location of an arc endpoint on the electrode body.

12. The electrode assembly of claim 11, wherein the structure for generating a magnetic field comprises at least one of a coiled wire and a solid magnet encircling at least a portion of the generally tubular wall of the electrode body.

13. The electrode assembly of claim 11, wherein the structure for generating a magnetic field is configured and positioned to generate a magnetic field configured to maintain the location of the arc endpoint substantially on the edge of the protrusion.

14. The electrode assembly of claim 13, wherein the electrode body further comprises at least one electrically insulating member disposed at least partially within the generally tubular wall of the electrode body, the at least one electrically insulating member covering at least a portion of the inner surface of the generally tubular wall and leaving exposed at least the edge of the protrusion.

15. The electrode assembly of claim 11, wherein the protrusion comprises an integral portion of the generally tubular wall.

16. The electrode assembly of claim 11, wherein the edge of the protrusion extends along an intersection between two substantially frustoconical surfaces of the protrusion, the edge exhibiting a substantially circular shape.

17. A plasma generating apparatus comprising:

a chamber having an inlet and an outlet; and an anode assembly and a cathode assembly configured and positioned to provide an electrical arc within the chamber and extending between an arc endpoint on a cathode of the cathode assembly and an arc endpoint on an anode of the anode assembly, at least one of the anode assembly and the cathode assembly comprising:

an electrically conductive electrode body comprising a generally tubular wall having an inner surface and an outer surface, a protrusion protruding from the generally tubular wall in a generally radially inward direction, the protrusion comprising an edge extending along an intersection between at least two surfaces of the protrusion, and at least one electrically insulating member disposed at least partially within the generally tubular wall of the electrode body, the at least one electrically insulating member covering at least a portion of the inner surface of the generally tubular wall and leaving exposed at least the edge of the protrusion; and a structure for generating a magnetic field configured and positioned to control a location of an arc endpoint on the electrode body.

18. The apparatus of claim 17, wherein the structure for generating a magnetic field comprises at least one of a coiled wire and a solid magnet encircling at least a portion of the generally tubular wall of the electrode body.

19. The apparatus of claim 17, wherein the structure for generating a magnetic field is configured and positioned to generate a magnetic field configured to maintain the location of the arc endpoint on the edge of the protrusion.

20. The apparatus of claim 17, wherein the protrusion comprises an integral portion of the generally tubular wall.

21. The apparatus of claim 17, wherein the edge of the protrusion extends along an intersection between two substantially frustoconical surfaces of the protrusion, the edge exhibiting a substantially circular shape.

22. A method of generating a plasma comprising:

providing a plasma generation apparatus comprising an anode and a cathode longitudinally spaced from the anode;

covering at least a portion of at least one inner surface of a generally tubular wall of an electrode body of at least one of the anode and the cathode with at least one electrically insulating member to constrain a location of an arc endpoint to an exposed location on the electrode body within the generally tubular wall, comprising substantially constraining the location of the arc endpoint to an edge on a protrusion protruding from the generally tubular wall in a generally radially inward direction;

introducing matter to a region between the anode and the cathode;

generating a voltage between the anode and the cathode to establish an electrical arc extending therebetween; and generating at least one magnetic field in at least one area of the region between the anode and the cathode through which at least a portion of the electrical arc passes.

23. The method of claim 22, wherein covering at least a portion of at least one inner surface of a generally tubular wall of an electrode body of at least one of the anode and the cathode with at least one electrically insulating member comprises:

covering at least a portion of at least one inner surface of the generally tubular wall with a first electrically insulating member disposed within the generally tubular wall on a first side of the protrusion; and covering at least another portion of at least one inner surface of the generally tubular wall with a second electrically insulating member disposed within the generally tubular wall on a second side of the protrusion.

24. A method of generating a plasma comprising:

providing an anode and a cathode longitudinally spaced from the anode;

introducing matter to a region extending longitudinally between the anode and the cathode;

generating a voltage between the anode and the cathode to establish an electrical arc extending between the anode and the cathode;

generating at least one magnetic field in at least one region through which at least a portion of the electrical arc passes; and generating a magnetic field within a generally tubular wall of an electrode body of at least one of the anode and the cathode to substantially constrain a location of an arc endpoint to an exposed location on the electrode body within the generally tubular wall, comprising substantially constraining the location of the arc endpoint to an edge on a protrusion protruding from the generally tubular wall in a generally radially inward direction.

25. A method of generating a plasma comprising:

providing an anode and a cathode longitudinally spaced from the anode;

covering at least a portion of at least one inner surface of a generally tubular wall of an electrode body of at least one of the anode and the cathode with at least one electrically insulating member;

introducing matter to a region extending longitudinally between the anode and the cathode;

generating a voltage between the anode and the cathode to establish an electrical arc extending between the anode and the cathode;

generating at least one magnetic field in at least one region through which at least a portion of the electrical arc passes; and generating a magnetic field within the generally tubular wall to substantially constrain a location of an arc endpoint to an exposed location on the electrode body within the generally tubular wall.

* * * * *